United States Patent
Svensson et al.

(10) Patent No.: US 10,065,612 B2
(45) Date of Patent: Sep. 4, 2018

(54) VEHICLE LOW PRESSURE BRAKE ARRANGEMENT

(71) Applicant: Autoliv Development AB, Vårgårda (SE)

(72) Inventors: Christian Svensson, Vårgårda (SE); Dan Bråse, Vårgårda (SE); Erik Rydsmo, Sollebrunn (SE); Jan-Erik Källhammer, Linköping (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 59 days.

(21) Appl. No.: 15/125,643

(22) PCT Filed: Mar. 10, 2015

(86) PCT No.: PCT/SE2015/050264
§ 371 (c)(1),
(2) Date: Sep. 13, 2016

(87) PCT Pub. No.: WO2015/137867
PCT Pub. Date: Sep. 17, 2015

(65) Prior Publication Data
US 2017/0008497 A1    Jan. 12, 2017

(30) Foreign Application Priority Data
Mar. 14, 2014 (SE) .................... 1450289-2

(51) Int. Cl.
*B60T 1/14* (2006.01)

(52) U.S. Cl.
CPC .................... *B60T 1/14* (2013.01)

(58) Field of Classification Search
CPC ........................................ B60T 1/14
See application file for complete search history.

(56) References Cited

U.S. PATENT DOCUMENTS

| 1,495,916 A | * | 5/1924 | Mcnames | B60T 1/14 188/5 |
| 2,960,191 A | * | 11/1960 | Roberts | B60T 1/14 188/4 R |

(Continued)

FOREIGN PATENT DOCUMENTS

| CN | 2827800 Y | 10/2006 |
| CN | 202624181 U | 12/2012 |
| WO | WO-2008031180 A1 | 3/2008 |

OTHER PUBLICATIONS

International Search Report and Written Opinion of the ISA for PCT/SE2015/050264, ISA/SE, Stockholm, dated Jun. 26, 2015.

*Primary Examiner* — Nicholas J Lane
(74) *Attorney, Agent, or Firm* — Stephen T. Olson; Harness, Dickey & Pierce, P.L.C.

(57) ABSTRACT

A vehicle braking arrangement includes a braking plate and a link arm arranged to connect the braking plate to a vehicle. The braking plate is movable from a rest position to a braking position where contact is made with the ground. The braking plate is arranged for a first mode of operation, corresponding to the rest position, and a second mode of operation, corresponding to the braking position. In the first mode of operation, the braking plate has a first contact area arranged to face the ground, and in the second mode of operation, the braking plate has a second contact area arranged to face the ground. The second area exceeds the first area.

14 Claims, 10 Drawing Sheets

(56) References Cited

U.S. PATENT DOCUMENTS

| | | | | |
|---|---|---|---|---|
| 3,659,678 | A | | 5/1972 | Hall, Jr. |
| 3,799,293 | A | * | 3/1974 | Howells .................... B60T 1/14 188/5 |
| 4,019,698 | A | | 4/1977 | Earl |
| 4,317,507 | A | * | 3/1982 | McMillan ................. B60T 1/14 188/2 R |
| 4,825,978 | A | * | 5/1989 | Verano ..................... B60T 1/14 152/225 R |
| 8,356,685 | B2 | | 1/2013 | Baumann |
| 2011/0017538 | A1 | * | 1/2011 | Baumann ................. B60T 1/14 180/164 |
| 2016/0052493 | A1 | * | 2/2016 | Rydsmo ................... B60T 1/14 188/5 |
| 2017/0015287 | A1 | * | 1/2017 | Sander ..................... B60T 1/12 |

\* cited by examiner

VEHICLE LOW PRESSURE BRAKE ARRANGEMENT

CROSS-REFERENCE TO RELATED APPLICATIONS

This application is a 371 U.S. National Stage of International Application No. PCT/SE2015/050263, filed Mar. 10, 2015, which claims the benefit of and priority to Swedish Patent Application No. 1450289-2, filed Mar. 14, 2014. The entire disclosures of both of the above applications are incorporated herein by reference.

DESCRIPTION OF THE INVENTION

The present invention relates to a vehicle braking arrangement comprising a braking plate and a link arm arranged to connect the braking plate to a vehicle. The braking plate is movable from a rest position with a certain ground clearance to a braking position where contact is made with the ground.

In many traffic situations it is desired to acquire an enhanced braking effect, for example at collision situations and when the road grip is lost. One way to achieve an enhanced braking effect is described in U.S. Pat. No. 8,356,685, where a braking plate may be lowered. When lowered, a vacuum chamber of the plate faces the road, the vacuum chamber being evacuated such that a retaining function is obtained by the plate being pressed against the road due to the lowered pressure in the vacuum chamber. The lowered pressure is obtained by means of a gas generator acting on a so-called Venturi tube.

However, the contact area of a vacuum brake plate that is intended to be lowered to the ground is of importance, since the braking force F depends on the pressure difference and the contact area. Due to limitations regarding available space, the area that the braking plate may occupy offers limitations.

It is therefore an object of the present invention to provide an enhanced emergency braking arrangement where a braking plate with a contact area that exceeds prior art is provided.

Said object is achieved by means of a vehicle braking arrangement comprising a braking plate and a link arm arranged to connect the braking plate to a vehicle. The braking plate is movable from a rest position with a certain ground clearance to a braking position where contact is made with the ground.

The braking plate is arranged for a first mode of operation and a second mode of operation, where the first mode of operation corresponds to the rest position and where the second mode of operation corresponds to the braking position. In the first mode of operation, the braking plate has a first contact area arranged to face the ground and in the second mode of operation, the braking plate has a second contact area arranged to face the ground. The second area exceeds the first area.

According to an example, the braking plate comprises at least one sealing rim each which is arranged to run circumferentially and to at least partially contact the ground in the braking position. At least one at least partly enclosed volume is then formed between the braking plate and the ground.

According to another example, in the braking position, the pressure is lowered in each volume, which results in that the braking plate is pressed against the ground by a conferred pressure difference between air outside each volume and air in each volume. Then, a retaining force between the braking plate and the ground is obtained.

According to another example, the braking plate comprises a circumferentially running sealing rim where the circumference is broken at at least one break position. At each break position, the ends of the circumference are separated by a plurality of inserts that in the first mode of operation are stacked on top of each other in a fan-like lamellar structure.

In one example, the circumferentially running sealing rim is broken only at one break position having a first end and a second end. The inserts run from the broken circumference across an inner volume of the braking plate towards an opposite side of the circumference, where the inserts are pivotally arranged along a mounting rod. All inserts comprise a corresponding sealing rim piece, the sealing rim pieces separating the first end of the circumference and the second end of the circumference.

According to another example, in the second mode of operation, the first end of the circumference and the second end of the circumference have been separated from each other along the circumferential extension, and the inserts have been spread between them such that the sealing rim and the sealing rim pieces of the inserts are arranged in one common plane that is arranged to face the ground.

According to another example, the braking plate comprises at least two braking plate sectors of equal dimensions which are stacked on top of each other in a pile in the first mode of operation. Each braking plate sector has a circumferentially running sealing rim and a corresponding inner volume.

Furthermore, the braking plate sectors are arranged to be spread in a fan-like manner, such that all circumferentially running sealing rims are positioned in a common plane that is arranged to face the ground at the second mode of operation.

According to another example, the braking plate comprises a first link arm, a second link arm, a third link arm and a fourth link arm. Each link arm has a longitudinal extension with a first end part and a second end part. A partial sealing rim is attached to a part of the side of each link arm which is intended to face the ground.

Furthermore, the first end parts of the first link arm and the second link arm are connected to each other in a pivoting manner by a first connecting member;
the first end parts of the third link arm and the fourth link arm are connected to each other in a pivoting manner by a second connecting member;
the first link arm and the third link arm are connected to each other in at least a pivoting manner; and
the second link arm and the fourth link arm are connected to each other in at least a pivoting manner.

The braking plate further comprises at least one piston assembly. Said piston assembly is arranged to separate the second end parts of the first link arm and the third link arm from the second end parts of the second link arm and the fourth link arm when the braking plate is changed from the first mode of operation to the second mode of operation, unfolding the link arms.

Other examples are evident from the dependent claims.

A number of advantages are obtained by means of the present invention. Mainly, a lowered braking plate may offer an increased retaining force than described previously.

BRIEF DESCRIPTION OF THE DRAWINGS

The present invention will now be described more in detail with reference to the appended drawings, where.

DETAILED DESCRIPTION

Figure 1:
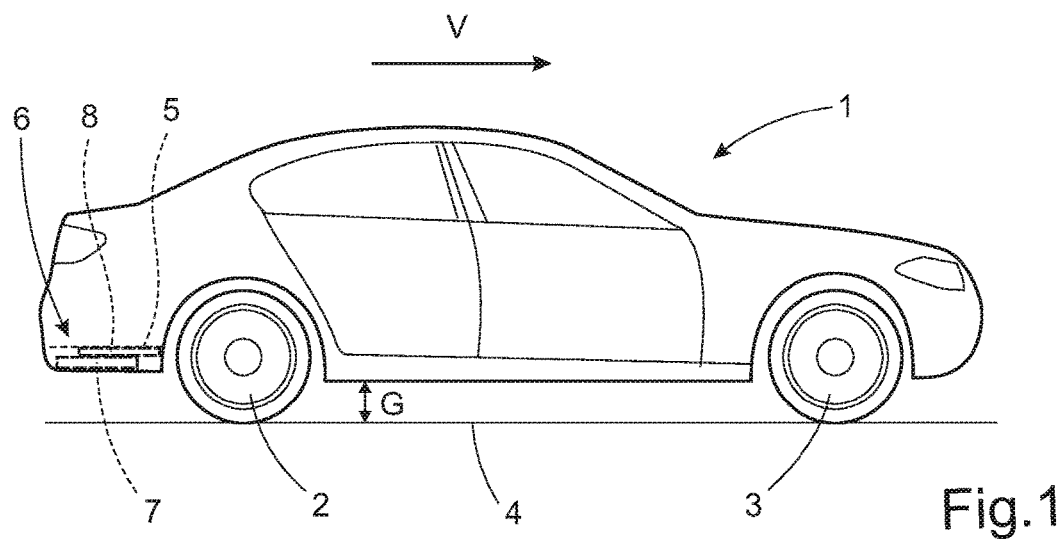
FIG. 1 shows a schematic side view of a vehicle during normal running with the vehicle braking arrangement in its rest position.

With reference to FIG. 1, showing a side view of a vehicle 1, where the vehicle 1 comprises wheels 2, 3 which are in contact with the ground 4 during normal running. Here, the vehicle 1 is assumed to be running in a forward direction V. At the rear of the vehicle 1, attached to a bottom floor 5, an emergency braking system 6 is arranged and is shown in its rest position during normal running conditions, more or less obscured by the outer body of the vehicle 1, and preferably arranged to not disturb the vehicle's normal ground clearance G.

Figure 2:
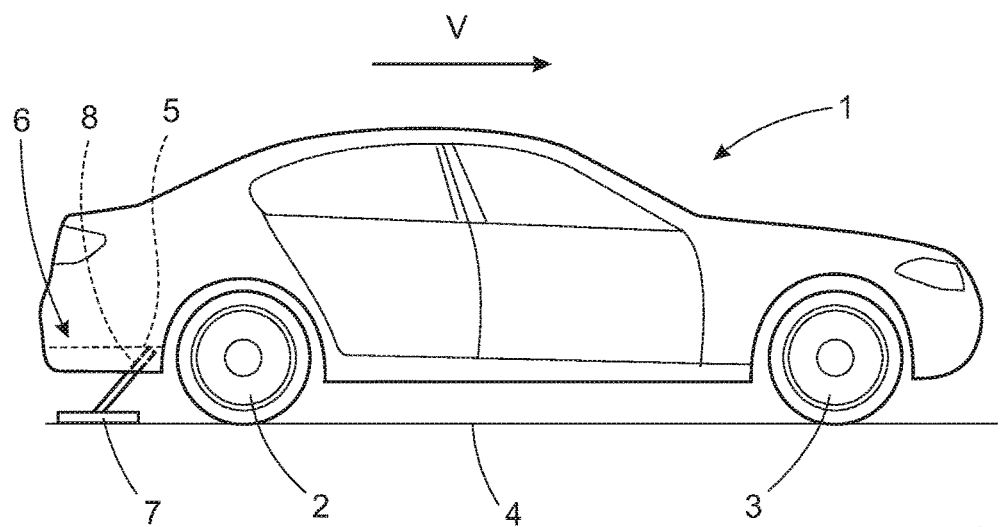
FIG. 2 shows a schematic side view of a vehicle with the vehicle braking arrangement in braking position.

FIG. 2 corresponds to FIG. 1, but here the emergency braking system 6 is shown with the braking plate 7 in the braking position. The braking plate 7 has here rapidly been displaced towards the ground to a braking position, for example by means of a pre-loaded spring (not shown) acting on a link assembly 8.

According to the present invention, the braking plate 7 is arranged for a first mode of operation and a second mode of operation, where the first mode of operation corresponds to the rest position and where the second mode of operation corresponds to the braking position. In the first mode of operation, the braking plate 7 has a first contact area A1 arranged to face the ground 4, and in the second mode of operation, the braking plate 7 has a second contact area A2 arranged to face the ground 4, where the second contact area A2 exceeds the first contact area A1, as indicated in for example FIG. 3 and FIG. 4, which will be discussed later.

This means that area of the side of the braking plate 7 that is arranged to face the ground, the contact area, is expanded from the first mode of operation to the second mode of operation. This area may be expanded in several ways, and in the following a number of examples are provided.

Figure 3:
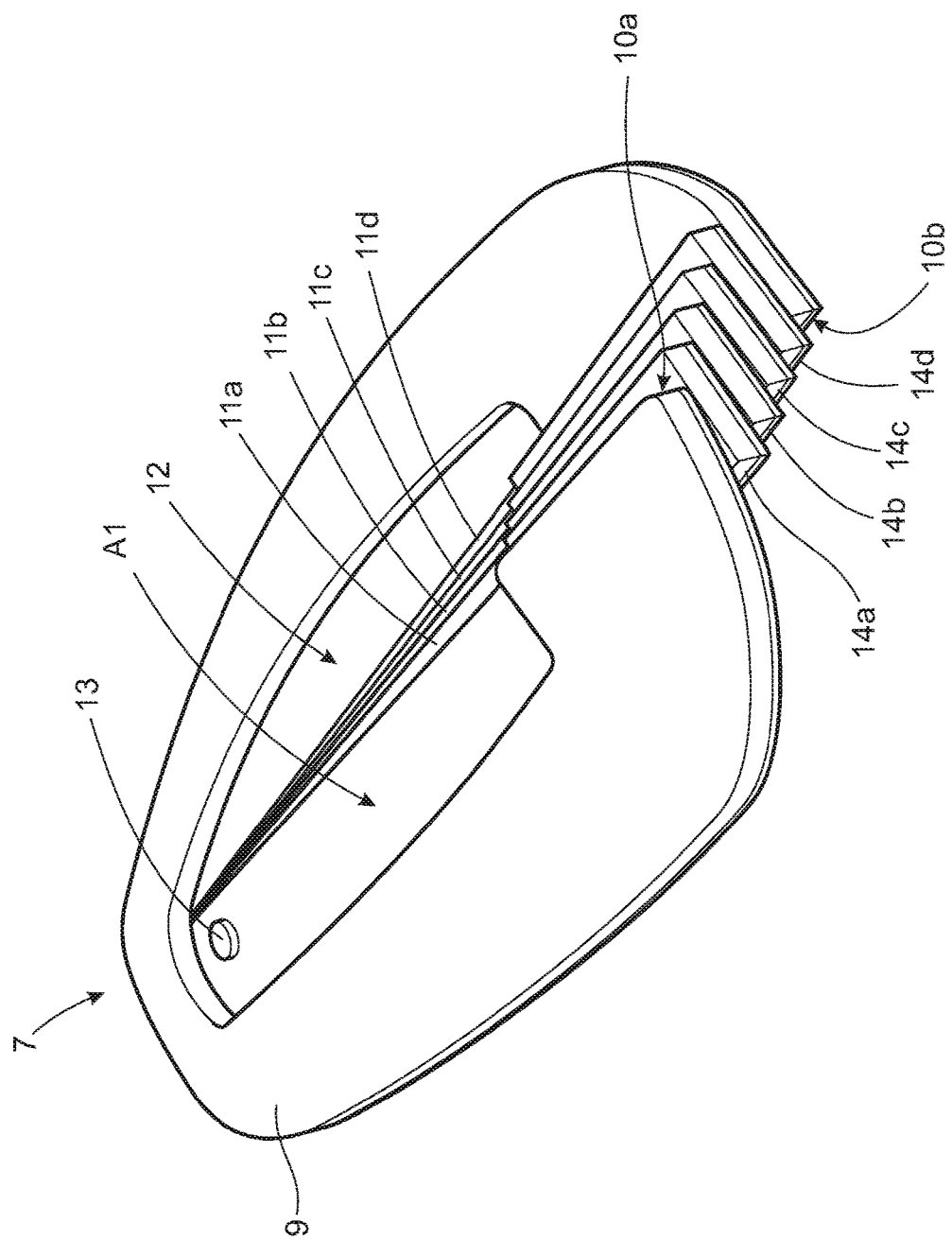
FIG. 3 shows a perspective bottom view of a first example of a vehicle braking plate according to the present invention in a first mode of operation.

In a first example with reference to FIG. 3, showing a bottom perspective view of a braking plate, the braking plate 7 is in the first mode of operation. The braking plate 7 has a circumference that comprises a sealing rim 9 which is arranged to partly provide a sealing between the braking plate 7 and the ground 4 when the braking plate 7 is in its braking position.

The circumference is broken at one position, where a first end 10a of the circumference and a second end 10b of the circumference are separated by a plurality of inserts 11a, 11b, 11c, 11d that are stacked on top of each other in a fan-like lamellar structure. The inserts 11a, 11b, 11c, 11d run from the broken circumference across an inner volume 12 of the braking plate 7 towards an opposite side of the circumference where the inserts 11a, 11b, 11c, 11d are pivotally arranged around a mounting rod 13. Each insert 11a, 11b, 11c, 11d comprises a corresponding sealing rim piece 14a, 14b, 14c, 14d where it is separating the first end 10a of the circumference and the second end 10b of the circumference. Within the sealing rim 9 and the sealing rim pieces 14a, 14b, 14c, 14d, the first contact area A1 is formed.

Figure 4:
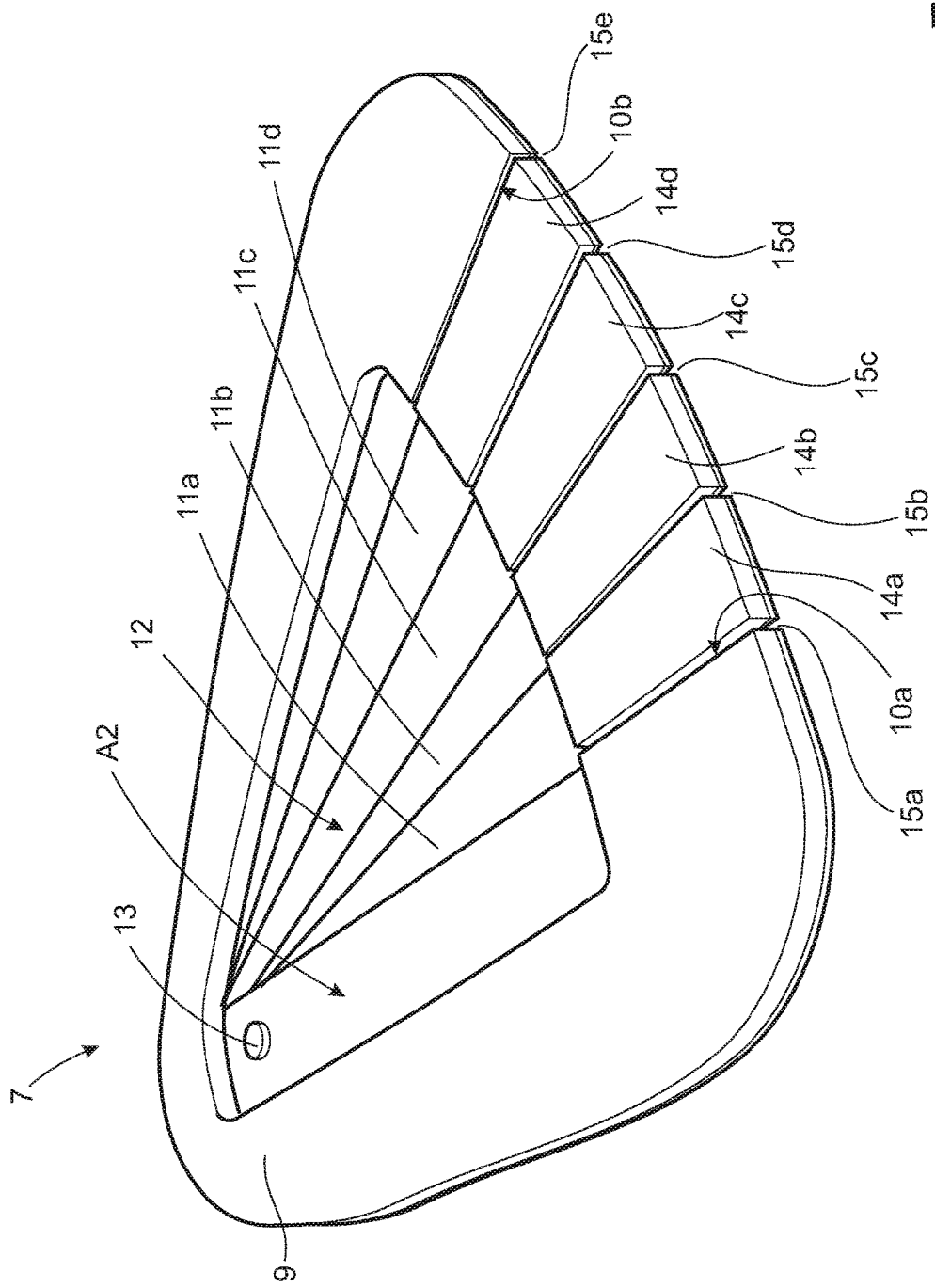
FIG. 4 shows a perspective bottom view of the first example of a vehicle braking plate according to the present invention in a second mode of operation.

FIG. 4 corresponds to FIG. 3, but here the braking plate 7 is shown in its second mode of operation. Here, the first end 10a of the circumference and the second end 10b of the circumference have been separated from each other along the circumferential extension, and the inserts 11a, 11b, 11c, 11d have been spread between them. The sealing rim 9 and the sealing rim pieces 14a, 14b, 14c, 14d of the inserts 11a, 11b, 11c, 11d are now arranged in one common plane that in this mode of operation is arranged to face the ground 4. In this way, a more or less continuous total sealing rim 9, 14a, 14b, 14c, 14d is formed, only being divided by gaps 15a, 15b, 15c, 15d, 15e between adjacent inserts 11a, 11b; 11b, 11c; 11c, 11d and between inserts 11a, 11d adjacent the sealing rim 9 at the first end 10a or second end 10b. Within said total sealing rim 9, 14a, 14b, 14c, 14d, the second contact area A2 is formed.

In order to accomplish this controlled spread of inserts, the inserts 11a, 11b, 11c, 11d have been turned around the mounting rod 13.

At this position, the pressure is lowered in the inner volume 12 in any suitable way, for example by means of a low pressure container, an expanding volume, a venture tube or similar. How the pressure is lowered in the inner volume is not part of this invention, and is not further discussed, many different arrangements being possible. A valve assembly may be arranged in the inner volume such that the inner volume is opened to a lowered pressure with a desired timing.

Figure 5:
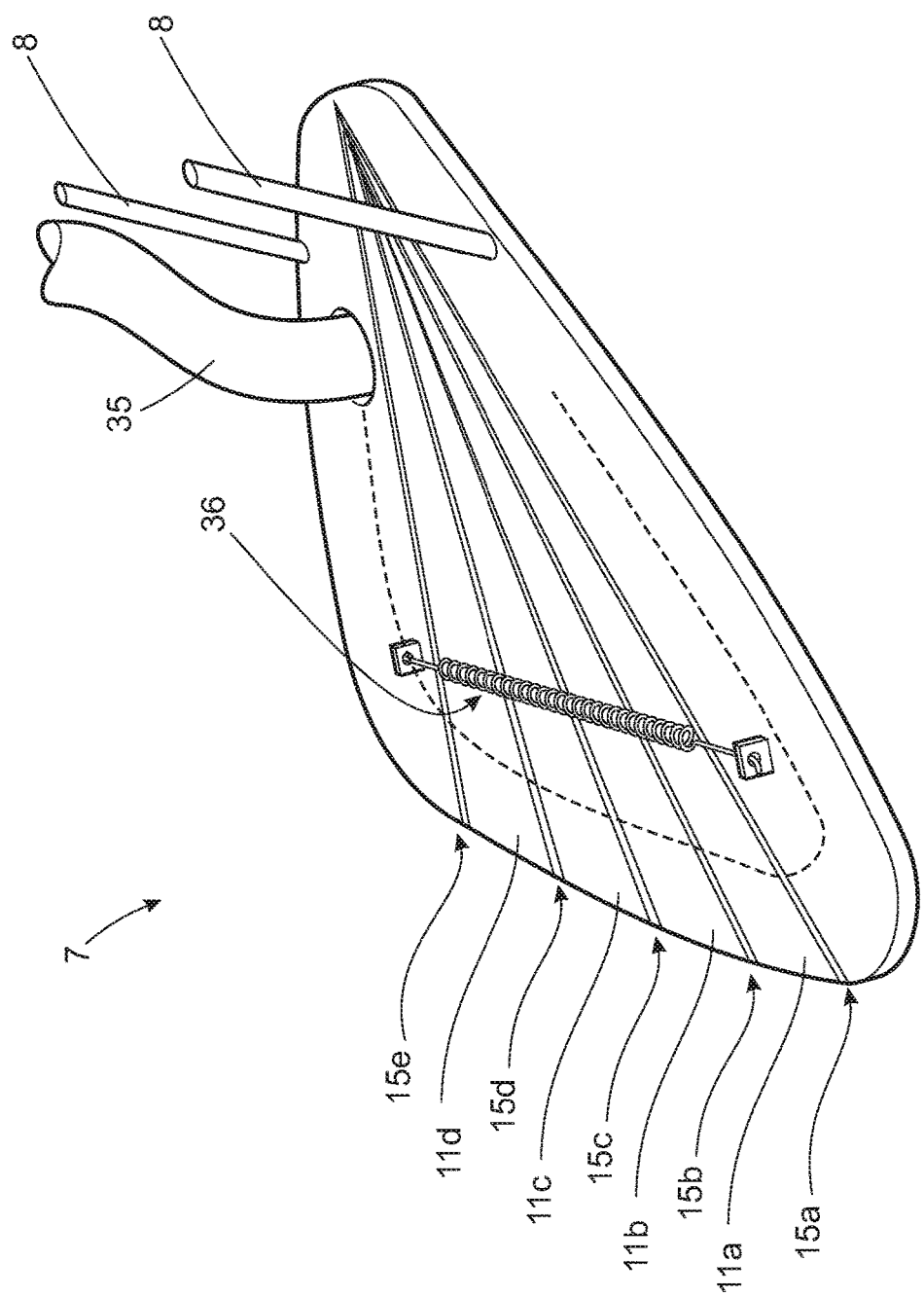
FIG. 5 shows a perspective top view of the first example of a vehicle braking plate according to the present invention in a second mode of operation.

With reference to FIG. 2, FIG. 4 and FIG. 5, FIG. 5 showing a perspective side view of the braking plate 7 in the braking position, the lowered pressure in the inner volume 12, here accomplished by means of an evacuation pipe 35, results in that the braking plate 7 is pressed against the ground 4 by a conferred pressure difference $\Delta P$ between air outside the inner volume 12 and air in the inner volume 12, such that a retaining force F between the braking plate 7 and the ground 4 is obtained. The retaining force F between the braking plate 7 and the ground 4 is depends on the pressure difference ΔP and the second contact area A2. A spring means 36 is shown in FIG. 5, being used for maintaining a good contact between the inserts 11a, 11b, 11c, 11d and the rest of the braking plate 7.

Figure 6:
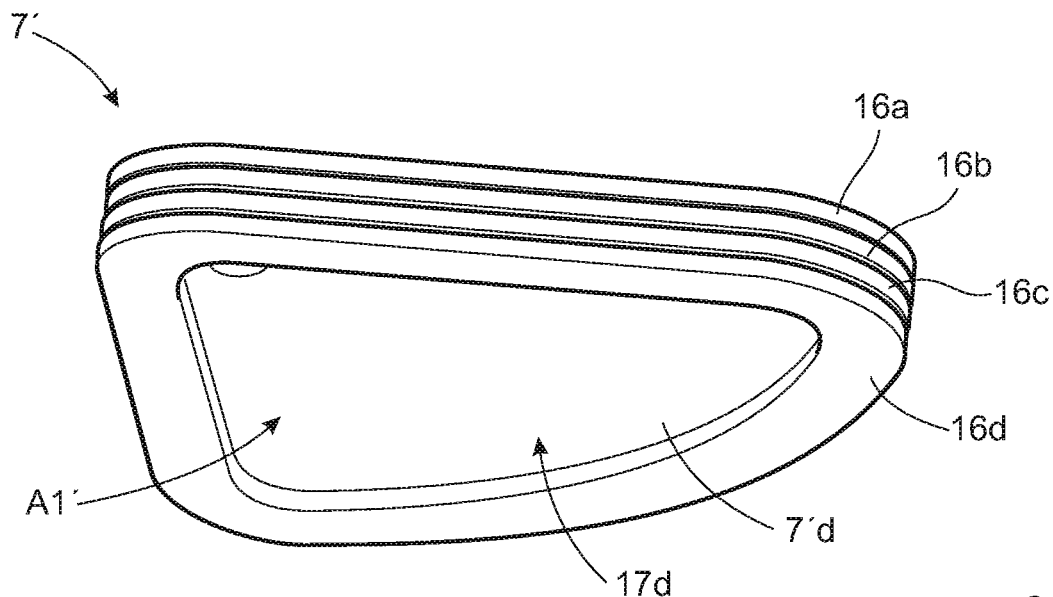
FIG. 6 shows a perspective bottom view of a second example of a vehicle braking plate according to the present invention in a first mode of operation.
Figure 7:
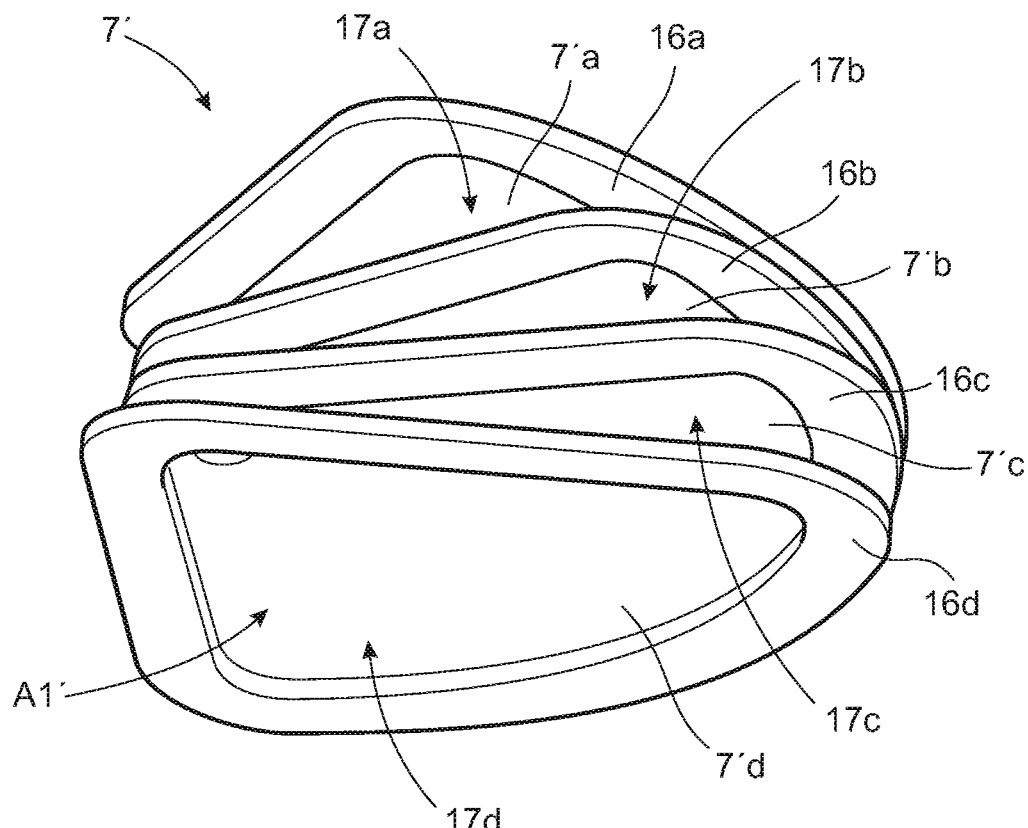
FIG. 7 shows a perspective bottom view of the second example of a vehicle braking plate according to the present invention when deployment has been initiated.
Figure 8:
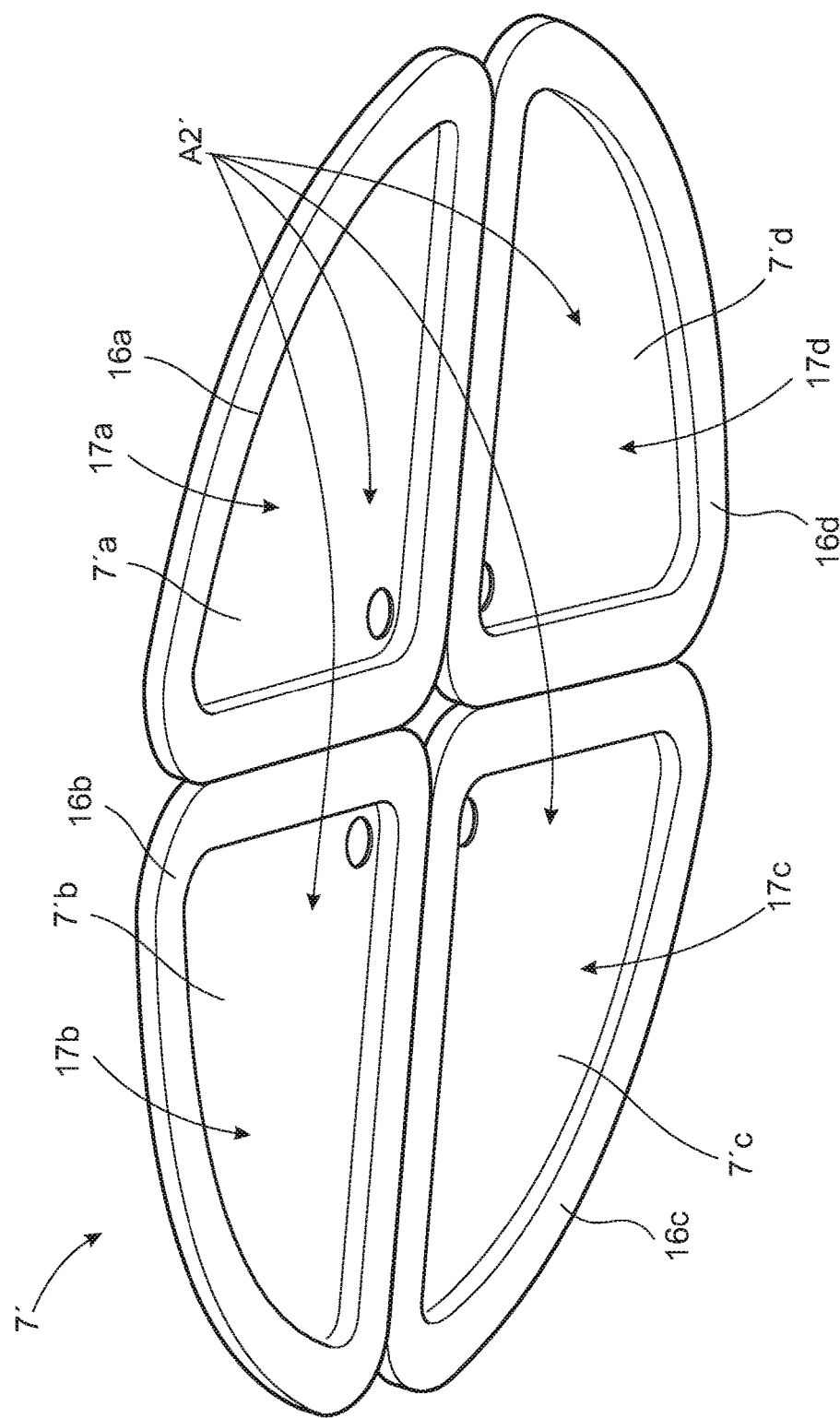
FIG. 8 shows a perspective bottom view of the second example of a vehicle braking plate according to the present invention in a second mode of operation.

In a second example with reference to FIG. 6 showing a bottom perspective view of a braking plate 7', the braking plate 7' is in the first mode of operation. With reference also to FIG. 7, the braking plate 7' comprises four braking plate sectors 7'a, 7'b, 7'c, 7'd of equal dimensions which are stacked on top of each other in a pile. Each braking plate sector 7'a, 7'b, 7'c, 7'd is self-supporting, having its own circumferentially running sealing rim 16a, 16b, 16c, 16d and inner volume 17a, 17b, 17c, 17d as shown in FIG. 7 and FIG. 8. Within the sealing rim 16d of the bottom braking plate sector 7'd, the first contact area A1' is formed.

In FIG. 7, the deployment of the braking plate 7' has been initiated by the braking plate sectors 7'a, 7'b, 7'c, 7'd being spread in a fan-like manner, and in FIG. 8 the braking plate 7' is in the second mode of operation, being completely deployed. All circumferentially running sealing rims 16a, 16b, 16c, 16d are positioned in a common plane that in this mode of operation is arranged to face the ground 4. The second contact area A2' is formed as a sum of the areas within the sealing rims 16a, 16b, 16c, 16d of all braking plate sectors 7'a, 7'b, 7'c, 7'd.

At this position, the pressure is lowered in each inner volume 17a, 17b, 17c, 17d in any suitable way as discussed for the first example, for example via a corresponding valve assembly of the type discussed for the first example for each one of the braking plate sectors.

The lowered pressure in the inner volumes 17a, 17b, 17c, 17d results in that the braking plate 7' is pressed against the ground 4 by a conferred pressure difference ΔP' between air outside the inner volumes 17a, 17b, 17c, 17d and air in the inner volumes 17a, 17b, 17c, 17d, such that a retaining force F' between the braking plate 7' and the ground 4 is obtained. The retaining force F' between the braking plate 7' and the ground 4 depends on the pressure difference ΔP' and the second contact area A2'.

Figure 9:
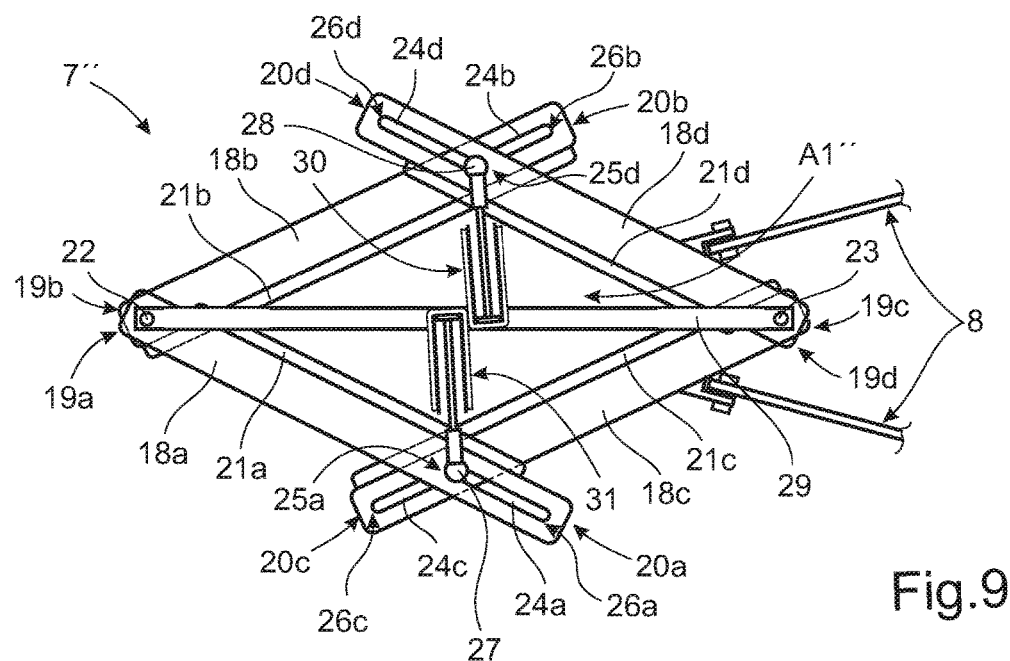
FIG. 9 shows a bottom view of a third example of a vehicle braking plate according to the present invention in a first mode of operation.

In a third example with reference to FIG. 9, showing a top view of a braking plate 7", the braking plate 7" is in the first mode of operation. The braking plate 7" comprises a first link arm 18a, a second link arm 18b, a third link arm 18c and a fourth link arm 18d, each link arm 18a, 18b, 18c, 18d having a longitudinal extension with a first end part 19a, 19b, 19c, 19d and a second end part 20a, 20b, 20c, 20d. On a part of the side of each link arm 18a, 18b, 18c, 18d which is intended to face the ground 4, a corresponding partial sealing rim 21a, 21b, 21c, 21d is attached. Within the partial sealing rims 21a, 21b, 21c, 21d in this position, the first contact area A1" is formed.

A link assembly 8 is connected to the third link arm 18c and the fourth link arms 18d, where the link assembly 8 is intended for attaching the braking plate 7" to the bottom of a vehicle 1.

The first end parts 19a, 19b of the first link arm 18a and the second link arm 18b are connected to each other in a pivoting manner by a first connecting member 22. The first end parts 19c, 19d of the third link arm 18c and the fourth link arm 18d are also connected to each other in a pivoting manner by a second connecting member 23.

At the second end part 20a, 20b, 20c, 20d of each link arm, a corresponding first slot 24a, second slot 24b, third slot 24c and fourth slot 24d extends a certain distance towards the corresponding first end part 19a, 19b, 19c, 19d. The length of each slot 24a, 24b, 24c, 24d does not exceed half the length of any link arm 18a, 18b, 18c, 18d along its longitudinal extension. Each slot 24a, 24b, 24c, 24d has a first end 25a, 25b, 25c, 25d and a second end 26a, 26b, 26c, 26d, where each first end 25a, 25b, 25c, 25d is closer to the corresponding first end part 19a, 19b, 19c, 19d than each second end 26a, 26b, 26c, 26d.

The first slot 24a is connected to the third slot 24c by a first sliding rod 27 that runs through the first slot 24a and the third slot 24c. Correspondingly, the second slot 24b is connected to the fourth slot 24d by a second sliding rod 28 that runs through the second slot 24b and the fourth slot 24d. In the first mode of operation, the sliding rods 27, 28 run through the corresponding slots 24a, 24c; 24b, 24d at the corresponding first end 25a, 25b, 25c, 25d.

A central rod 29 runs between the connecting members 22, 23. At a central part of the central rod 29, a first piston assembly 30 and a second piston assembly 31 are attached. The first piston assembly 30 is connected to the second sliding rod 28, and the second piston assembly 31 is connected to the first sliding rod 27.

Figure 10:
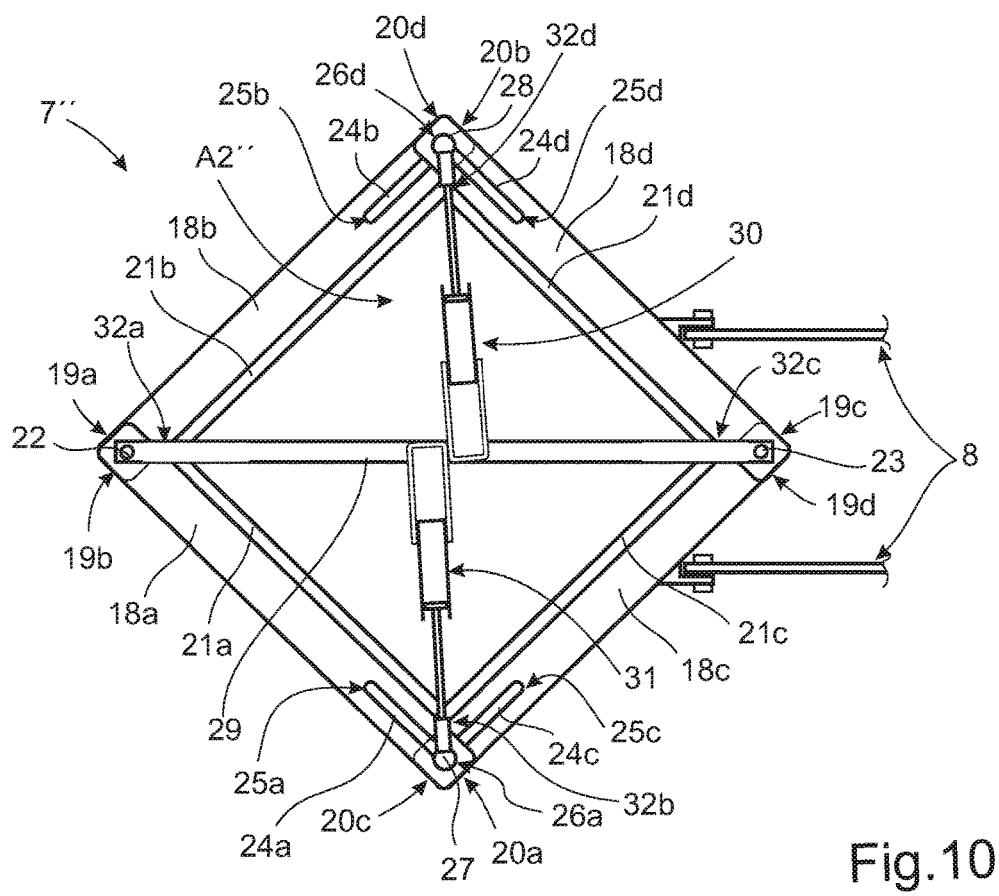
FIG. 10 shows a bottom view of the third example of a vehicle braking plate according to the present invention in a second mode of operation.

FIG. 10 corresponds to FIG. 9, but here the braking plate 7" is in the second mode of operation. The piston assemblies 30, 31 have been activated to push the sliding rods 27, 28 away from each other such that the sliding rods 27, 28 slide in the corresponding slots 24a, 24c; 24b, 24d, from the first ends 25a, 25b, 25c, 25d to the second ends 26a, 26b, 26c, 26d of the slots 24a, 24c; 24b, 24d. The piston assemblies 30, 31 may for example be propelled by means of pre-loaded springs or pyrotechnical charges.

By means of the movement described, the first link arm 18a and the second link arm 18b are pivoting around the first connecting member 22 such that the smallest angle formed between the first link arm 18a and the second link arm 18b is increased. Correspondingly, the third link arm 18c and the fourth link arm 18d are pivoting around the second connecting member 23 such that the smallest angle formed between the third link arm 18c and the fourth link arm 18d is increased.

In this manner, the braking plate 7" has been unfolded in the second mode of operation such that it may present an increased contact area, the second contact area A2" towards the ground when braking is desired by means of the braking plate. Furthermore, the partial sealing rims 21a, 21b, 21c, 21d have now been arranged such that they together form a circumferentially running sealing rim 21a, 21b, 21c, 21d, only being divided by gaps 32a, 32b, 32c, 32d between adjacent sealing partial rims 21a, 21b; 21a, 21c; 21c, 21d; 21d, 21b. Within the sealing rims 21a, 21b, 21c, 21d in this position, the second contact area A2" is now formed.

Figure 11:
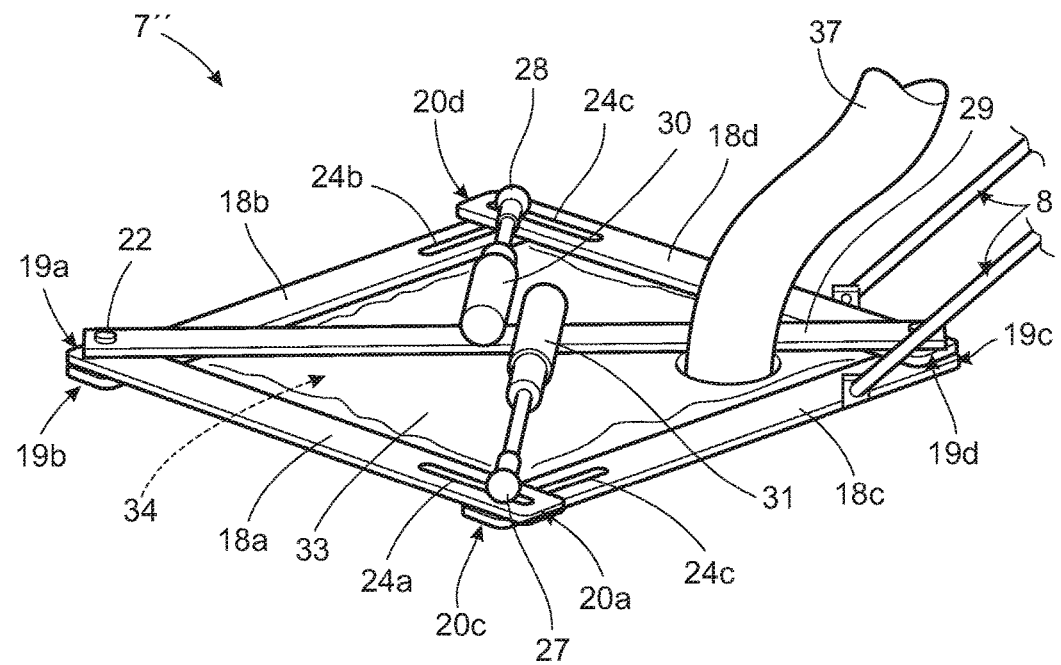
FIG. 11 shows a perspective top view of the third example of a vehicle braking plate according to the present invention in the second mode of operation.

FIG. 11 shows a top perspective view of the braking plate 7" in the second mode of operation, FIG. 11 corresponding to FIG. 10. Not shown in FIG. 9 and FIG. 10 for reasons of clarity, FIG. 11 discloses that a rubber canvas 33 is attached to the link arms 18a, 18b, 18c, 18d in an air-tight manner, where the rubber canvas 33 is spread and tightened between the link arms 18a, 18b, 18c, 18d at the second mode of operation. When the braking plate is lowered to the ground, an inner volume 34 is formed between the rubber canvas 33, the circumferentially running sealing rim 21a, 21b, 21c, 21d, and the ground 4.

At this position, the pressure is lowered in the inner volume 34 in any suitable way as discussed for the first example, for example via a corresponding valve assembly of the type discussed for the first example. An air evacuation pipe 37 is shown in FIG. 11.

As in the previous examples, the lowered pressure in the inner volume 34 results in that the braking plate 7" is pressed against the ground 4 by a conferred pressure difference ΔP" between air outside the inner volume 34 and air in the inner volume 34, such that a retaining force F" between the braking plate 7" and the ground 4 is obtained. The retaining force F" between the braking plate 7" and the ground 4 depends on the pressure difference ΔP" and the second contact area A2".

Figure 12:
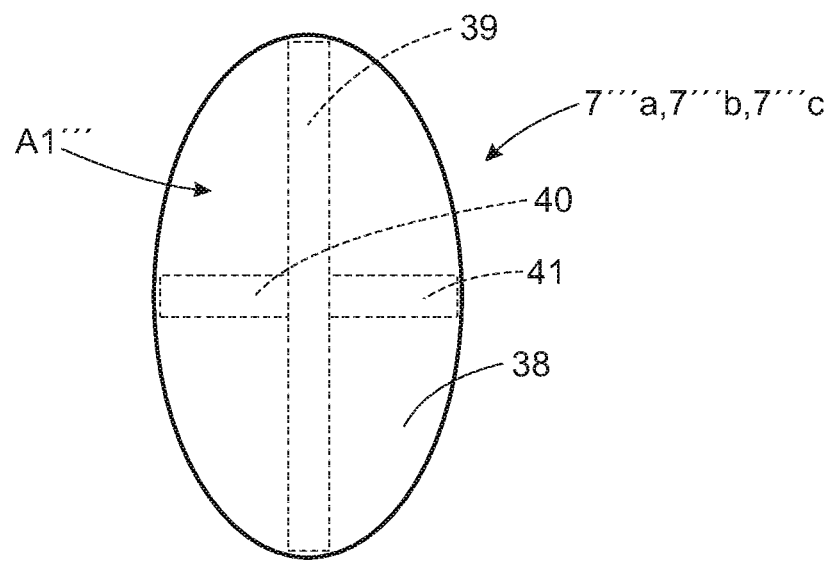
FIG. 12 shows a bottom view of an alternative of the third example of a vehicle braking plate according to the present invention a braking plate in a first mode of operation.
Figure 13:
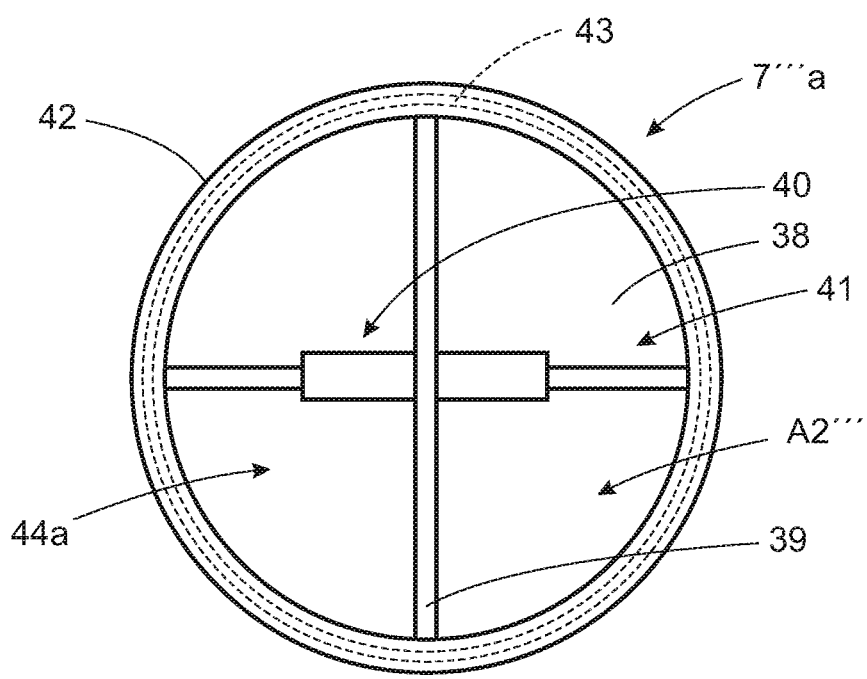
FIG. 13 shows a bottom view of a first example of the braking plate in FIG. 12 in a second mode of operation.
Figure 14:
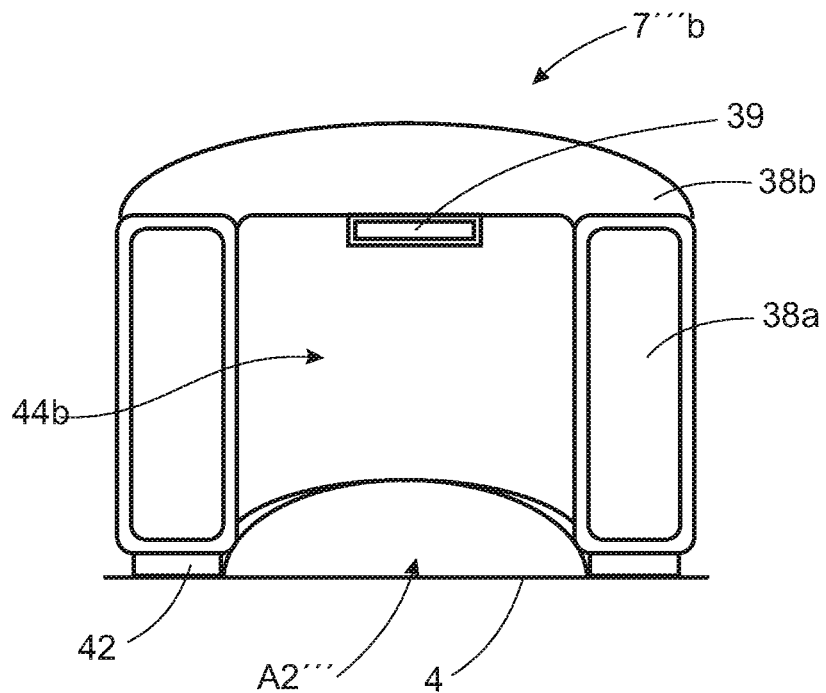
FIG. 14 shows a side perspective cut-open view of a second example of the braking plate in FIG. 12 in a second mode of operation.

An alternative for the third example will now be described with reference to FIG. 12, FIG. 13 and FIG. 14, FIG. 12 showing a bottom view of a braking plate 7'''a, 7'''b in a first mode of operation, FIG. 13 showing a bottom view of a first example of the braking plate 7'''a in a second mode of operation and FIG. 14 showing side perspective cut-open view of a second example of the braking plate 7'''b in a second mode of operation.

Here, there are no link arms. As shown in FIG. 12, a rubber canvas 38 is rolled or folded around a central rod 39, where at least one expandable member 40, 41 are arranged to unroll or unfold the rubber canvas 38 when activated, the braking plate 7'''a, 7'''b in the first mode of operation having a first contact area A1'''.

With reference to FIG. 12 and FIG. 13, said expandable member is in the form of piston assemblies 40, 41, and with reference to FIG. 12 and FIG. 14, said expandable member is in the form of at least one pyrotechnical charge 40, 41, not shown in FIG. 14 since said pyrotechnical charge 40, 41 then has detonated. In both cases, a sealing rim 42 is here continuous and is arranged to at least partially contact the ground 4 in the braking position. An at least partly enclosed volume 44a, 44b, 44c is then formed between the braking plate 7'''a, 7'''b and the ground 4. The partly enclosed volume 44a, 44b, 44c may not be completely enclosed due to leakage in the sealing rim 42, for example due to unevennesses in the surface of the ground 4, thus constituting an at least partly enclosed volume 44a, 44b, 44c.

In the former case, the braking plate 7'''a comprises a member 43 that is arranged to provide a desired shape to the second area in the braking position, for example a circumferentially running spring member 43 provided inside or along the sealing rim 42. Such a spring member 43 could for example provide a round shape for the second contact area A2''' when the rubber canvas 38 has been unrolled or unfolded.

In the latter case, the rubber canvas 38 comprises a circumferentially running tubular member 38a and a top 38b, where said pyrotechnical charge 40, 41 is arranged to inflate the circumferentially running tubular member 38a such that the top 38b is moved away from sealing rim 42 such that the partly enclosed volume 44b, here being an expandable volume, increases during the inflation. This results in a generation of a low pressure in the at least partly enclosed volume 44b with respect to ambient air. The shape of the braking plate 7'''b in this latter case is given by the shape of the inflated tubular member 38a.

Figure 15:
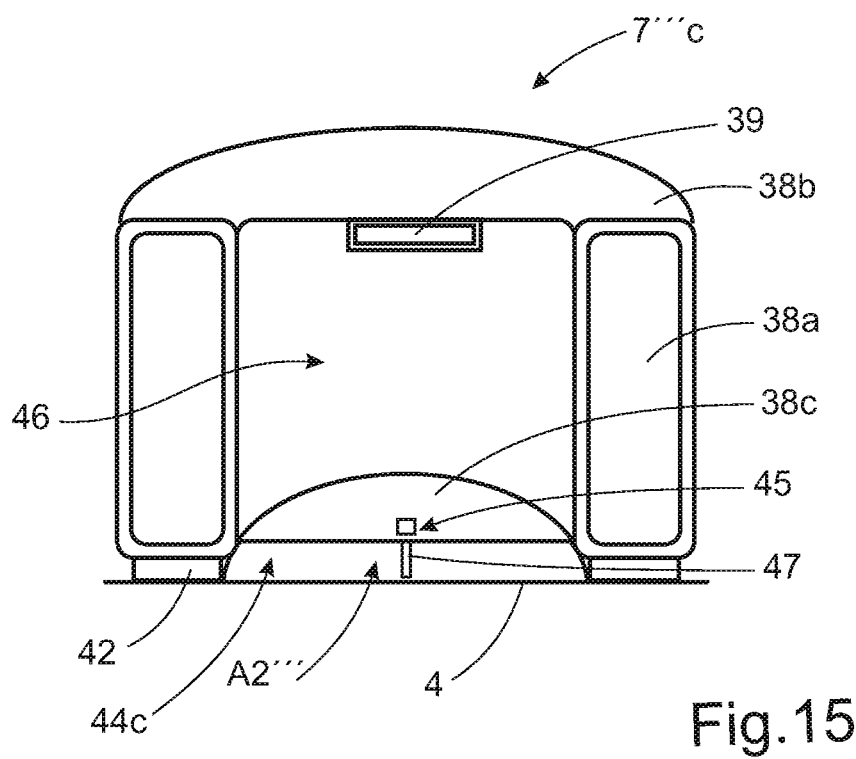
FIG. 15 shows a side perspective cut-open view of a further example of the second example of the braking plate in FIG. 12 in a second mode of operation.

With reference to FIG. 15, as a further example of a braking plate 7'''c according to the latter case, the rubber canvas 38 also comprises a bottom 38c, and a valve assembly 45 with a trigger pin 47. The bottom 38c divides an inner volume 46 and an at least partly enclosed volume 44c, where the inner volume 46 and the at least partly enclosed volume 44c are arranged to be fluidly connectable to each other by means of the valve assembly 45.

When the tubular member 38a is inflated, the inner volume 46 is arranged to expand when the braking plate 7 is taking the braking position by the top 38b and bottom 38c being moved away from each other such that the air pressure in the inner volume 46 initially falls below the air pressure of ambient air. When the braking plate 7 reaches the braking position, the valve assembly 45 is arranged to be opened by means of the trigger pin 47 hitting the ground 4, such that the pressure is lowered in the at least partly enclosed volume 44c by means of the lowered pressure in the inner volume 46. This results in that the braking plate 7 is pressed against the ground 4 by a conferred pressure difference between air outside the at least partly enclosed volume 44c and air in the at least partly enclosed volume 44c, such that a retaining force between the braking plate 7 and the ground 4 is obtained.

Instead of the valve assembly, generally constituting a venting arrangement, other types of venting arrangements are possible. For example, such a venting arrangement may be in the form of a membrane in the bottom 38c that is broken when the braking plate reaches the braking position.

For all examples, the retaining force F, F', F'' is dependent of the magnitude of pressure drop, which in its turn is dependent on the sealing properties of the sealing rim, and the capacity of the low pressure generation.

The steps performed when the braking plates is changed from the first mode of operation to the second mode of operation and is brought to a braking position are performed very rapidly.

The invention is not limited to the examples above, but may vary freely within the scope of the appended claims. For example, the rubber canvas may be substituted by a sheet made from any form of suitable material, for example airtightly coated airbag fabric, or any other type of airtight fabric.

The emergency braking system 6 is generally constituted by a vehicle braking arrangement.

In the first example, the area of the braking plate that is intended to face the ground in a braking position is increased in a fan-like manner. It is also conceivable that the circumference is broken at two opposite positions such that two circumference halves are provided with four ends. Then the area of the braking plate that is intended to face the ground in a braking position is increased by increasing the distance between the two circumference halves. Then the inserts are not pivotally arranged, but are then arranged in a sliding manner.

In the second example, there may be more or less braking plate sectors than the four shown, but there should be at least two.

In the third example, there may not be any slots. Instead, there first link arm and the third link arm may be connected by a connecting member allowing a pivoting movement in the same way as the first link arm and the second link arm are connected. A corresponding arrangement is then also provided for the second link arm and the fourth link arm. Then the link arms are moved by the piston assemblies such that the contact area towards the ground is increased without any sliding movements of the link arms.

In the third example and its alternative, there may be only one piston assembly that performs the movement of the link arms, or the unrolling/unfolding of the rolled/folded rubber canvas or similar in the alternative of the third example.

The invention claimed is:
1. A vehicle braking arrangement comprising:
   a braking plate; and
   a link arm arranged to connect the braking plate to a vehicle,
   wherein the braking plate is movable from a rest position with a certain ground clearance to a braking position where contact is made with the ground, the braking plate arranged for a first mode of operation and a second mode of operation, where the first mode of operation corresponds to the rest position and where the second mode of operation corresponds to the braking position, and where, in the first mode of operation, the braking plate has a first contact area arranged to face the ground and where, in the second mode of operation, the braking plate has a second contact area arranged to face the ground, where the second contact area exceeds the first area, and wherein the braking plate comprises a circumferentially running sealing rim, where the circumference is broken at at least one break position, where, at each break position, ends of the circumference are separated by a plurality of inserts that in the first mode of operation are stacked on top of each other in a fan-like lamellar structure.

2. The vehicle braking arrangement according to claim 1, wherein the braking plate further comprises at least one sealing rim, each sealing rim being arranged to run circumferentially and to at least partially contact the ground in the braking position, such that at least one at least partly enclosed volume then is formed between the braking plate and the ground.

3. The vehicle braking arrangement according to claim 2, wherein in the braking position, a pressure is lowered in each volume, which results in that the braking plate is pressed against the ground by a conferred pressure difference between air outside each volume and air in each volume, such that a retaining force between the braking plate and the ground is obtained.

4. The vehicle braking arrangement according to claim 1, wherein the circumference comprises a sealing rim and is broken only at one break position having a first end and a second end, where the inserts run from the broken circumference across an inner volume of the braking plate towards an opposite side of the circumference where the inserts are pivotally arranged along a mounting rod, all inserts comprising a corresponding sealing rim piece, the sealing rim pieces separating the first end of the circumference and the second end) of the circumference.

5. The vehicle braking arrangement according to claim 4, wherein in the second mode of operation, the first end of the circumference and the second end of the circumference have been separated from each other along a circumferential extension, and the inserts have been spread between them such that the sealing rim and the sealing rim pieces of the inserts are arranged in one common plane that is arranged to face the ground.

6. The vehicle braking arrangement according to claim 1, wherein the braking plate comprises at least two braking plate sectors of equal dimensions which are stacked on top of each other in a pile in the first mode of operation, each braking plate sector having a circumferentially running sealing rim and a corresponding inner volume.

7. The vehicle braking arrangement according to claim 6, wherein the braking plate sectors are arranged to be spread in a fan-like manner, such that all circumferentially running sealing rims are positioned in a common plane that is arranged to face the ground at the second mode of operation.

8. The vehicle braking arrangement according to claim 1 in combination with a vehicle.

9. A vehicle braking arrangement comprising:
a braking plate; and
a link arm arranged to connect the braking plate to a vehicle, wherein the braking plate is movable from a rest position with a certain ground clearance to a braking position where contact is made with the ground, the braking plate arranged for a first mode of operation and a second mode of operation, the first mode of operation corresponding to the rest position and the second mode of operation corresponding to the braking position, and where, in the first mode of operation, the braking plate has a first contact area arranged to face the ground and where, in the second mode of operation, the braking plate has a second contact area arranged to face the ground, where the second contact area exceeds the first area, and wherein the braking plate comprises a first link arm, a second link arm, a third link arm and a fourth link arm, each link arm having a longitudinal extension with a first end part and a second end part, where a partial sealing rim is attached to a part of the side of each link arm which is intended to face the ground, wherein:

the first end parts of the first link arm and the second link arm are connected to each other in a pivoting manner by a first connecting member, the first end parts of the third link arm and the fourth link arm are connected to each other in a pivoting manner by a second connecting member, the first link arm and the third link arm are connected to each other in at least a pivoting manner, and where the second link arm and the fourth link arm are connected to each other in at least a pivoting manner, the braking plate further comprises at least one piston assembly, where said piston assembly is arranged to separate the second end parts of the first link arm and the third link arm from the second end parts of the second link arm and the fourth link arm when the braking plate is changed from the first mode of operation to the second mode of operation, unfolding the link arms.

10. The vehicle braking arrangement according to claim 9, wherein, at the second end part of each link arm, a corresponding first slot, second slot, third slot and fourth slot extends a certain distance towards the corresponding first end part, where the first slot is connected to the third slot by a first sliding rod that runs through the first slot and the third slot, and that the second slot is connected to the fourth slot by a second sliding rod that runs through the second slot and the fourth slot.

11. The vehicle braking arrangement according to claim 10, wherein the said piston assembly is arranged to push the sliding rods away from each other such that the sliding rods slide in the corresponding slots, from a first end to a second end of each one of the slots where each first end is closer to a corresponding first end part than each second end.

12. The vehicle braking arrangement according to claim 9, wherein when the braking plate is in the second mode of operation, the partial sealing rims are arranged such that they together form a circumferentially running sealing rim, only being divided by gaps between adjacent sealing partial rims.

13. A vehicle braking arrangement comprising:
a braking plate; and
a link arm arranged to connect the braking plate to a vehicle, wherein the braking plate is movable from a rest position with a certain ground clearance to a braking position where contact is made with the ground, the braking plate arranged for a first mode of operation and a second mode of operation, where the first mode of operation corresponds to the rest position and where the second mode of operation corresponds to the braking position, and where, in the first mode of operation, the braking plate has a first contact area arranged to face the ground and where, in the second mode of operation, the braking plate has a second contact area arranged to face the ground, where the second contact area exceeds the first area, and wherein the braking plate comprises a rubber canvas or airtight fabric that is rolled or folded around a central rod, where at least one expandable member is arranged to unroll or unfold the rubber canvas or airtight fabric when activated, where the braking plate further comprises a sealing rim that is arranged to at least partially contact the ground in the braking position.

14. The vehicle braking arrangement according to claim 13, wherein the braking plate comprises a spring member that is arranged to provide a desired shape to the second contact area in the braking position.

\* \* \* \* \*